F. B. GRAHAM.
IMPREGNATOR.
APPLICATION FILED MAR. 23, 1914.
1,155,804.
Patented Oct. 5, 1915.
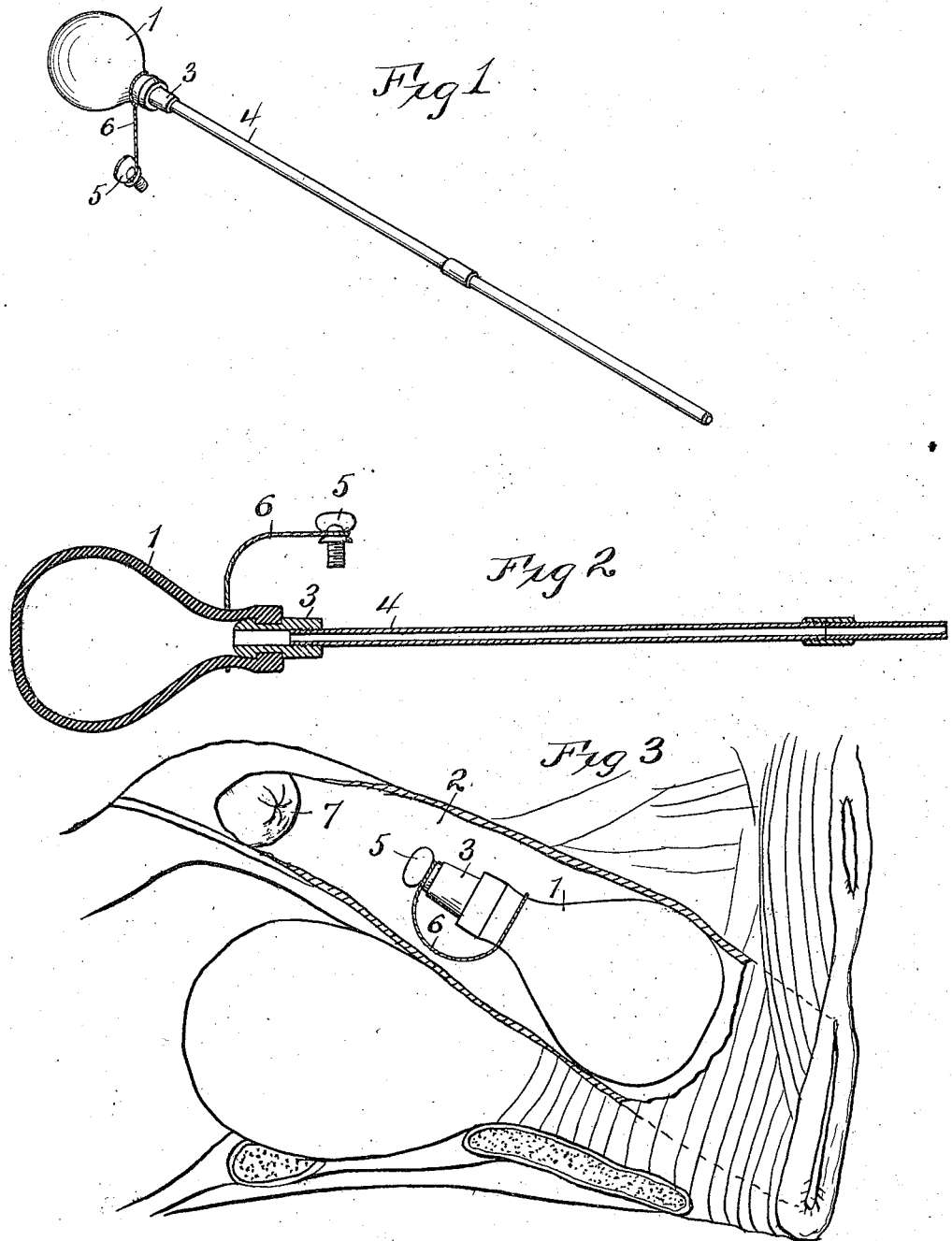
WITNESSES:
R. E. Hamilton
E. B. Houas
INVENTOR.
Frank B. Graham
BY Warren L. House
His ATTORNEY.

UNITED STATES PATENT OFFICE.

FRANK B. GRAHAM, OF KANSAS CITY, MISSOURI.

IMPREGNATOR.

1,155,804.      Specification of Letters Patent.      Patented Oct. 5, 1915.

Application filed March 23, 1914. Serial No. 826,514.

*To all whom it may concern:*

Be it known that I, FRANK B. GRAHAM, a citizen of the United States, residing at Kansas City, in the county of Jackson and State of Missouri, have invented a certain new and useful Improvement in Impregnators, of which the following is a specification.

My invention relates to improvements in impregnators.

The object of my invention is to provide an impregnator with which the impregnating fluid may be extracted and then transported to the place of use without danger of being devitalized during transportation owing to temperature changes.

A further object of my invention is to provide an impregnator which is simple in construction, which is durable, and which is easily manipulated.

Other novel features of my invention are hereinafter fully described and claimed.

In the accompanying drawings, which illustrate the preferred embodiment of my invention, Figure 1 is a perspective view of my improved impregnator. Fig. 2 is an enlarged longitudinal sectional view of the impregnator. Fig. 3 is a side elevation of the impregnator container mounted in the vaginal canal of an animal for transportation, the nozzle being detached, and the closure being shown in the operative position on the container.

Similar reference characters designate similar parts in the different views.

The impregnator is provided with a resilient container 1, preferably made of soft rubber, and having a diameter such that upon expanding, it will snugly fit within the vagina 2 of the animal in which it is to be transported.

The container 1 is, preferably, pear shaped, as shown, and is provided at its small end with an opening in which is fitted one end of a tubular coupling 3, the outer end of which is internally screw threaded, and adapted to have detachably fitted therein one end of a slender nozzle, 4, which is adapted to be inserted into an animal's womb, for the extraction therefrom and discharge therein of the seminal fluid.

A screw threaded closure comprising a stopper 5 is adapted for replacing the nozzle 4 in the coupling 3. The closure 5 is preferably attached to a cord 6 which is tied around or otherwise attached to the resilient container 1.

In the operation of my invention, the nozzle, fitted in the coupling 3, is inserted into the womb 7 of the female which has been served by a male, the container first being collapsed by pressure of the operator's hand. The container, after the nozzle has been thus inserted, is permitted to expand, thereby sucking through the nozzle into the container the fluid which is in the womb. The container and nozzle are then withdrawn and the closure 5 substituted for the nozzle 4. The container is then placed in the vagina 2 of the female, in the position shown in Fig. 3, in which position the container may be transported in the animal to the place where it is desired to impregnate a female. The container 1, being flexible and resilient readily conforms to the interior of the vaginal canal in which it is retained safely during transportation by reason of its expanding against the walls of the vagina. As the container is held during transportation in the vaginal canal of the animal, it is thereby retained at the temperature of the animal's body, thus eliminating danger of devitalization due to heat or cold. When the place has been reached at which the other female is to be impregnated, the container is removed from the animal in which it has been transported, the nozzle 4 substituted for the closure 5, and the nozzle inserted into the womb of the animal to be impregnated. The container 1 is then compressed, thereby expelling the fluid therefrom and discharging it through the nozzle into the womb.

I do not limit my invention to the structure shown and described, as modifications, within the scope of the appended claim, may be made without departing from the spirit of my invention.

Having thus described my invention, what I claim and desire to secure by Letters Patent, is:—

In an impregnator, a resilient semen container adapted for bodily insertion into and transportation in the vagina of an animal, and having a tubular internally screw threaded coupling through which the semen is received and discharged, an externally screw threaded nozzle adapted to be detachably fitted in said coupling, and adapted for insertion into the womb of an animal, a screw threaded plug adapted to be fitted in said coupling when the nozzle is detached therefrom, and flexible means for securing the plug to the container.

In testimony whereof I have signed my name to this specification in presence of two subscribing witnesses.

FRANK B. GRAHAM.

Witnesses:
 E. B. House,
 J. H. Cunningham.